3,085,011
PROCESS OF PREPARING A RICE PRODUCT
Truman B. Wayne, P.O. Box 13086, Houston, Tex.
Filed Feb. 18, 1960, Ser. No. 9,577
9 Claims. (Cl. 99—80)

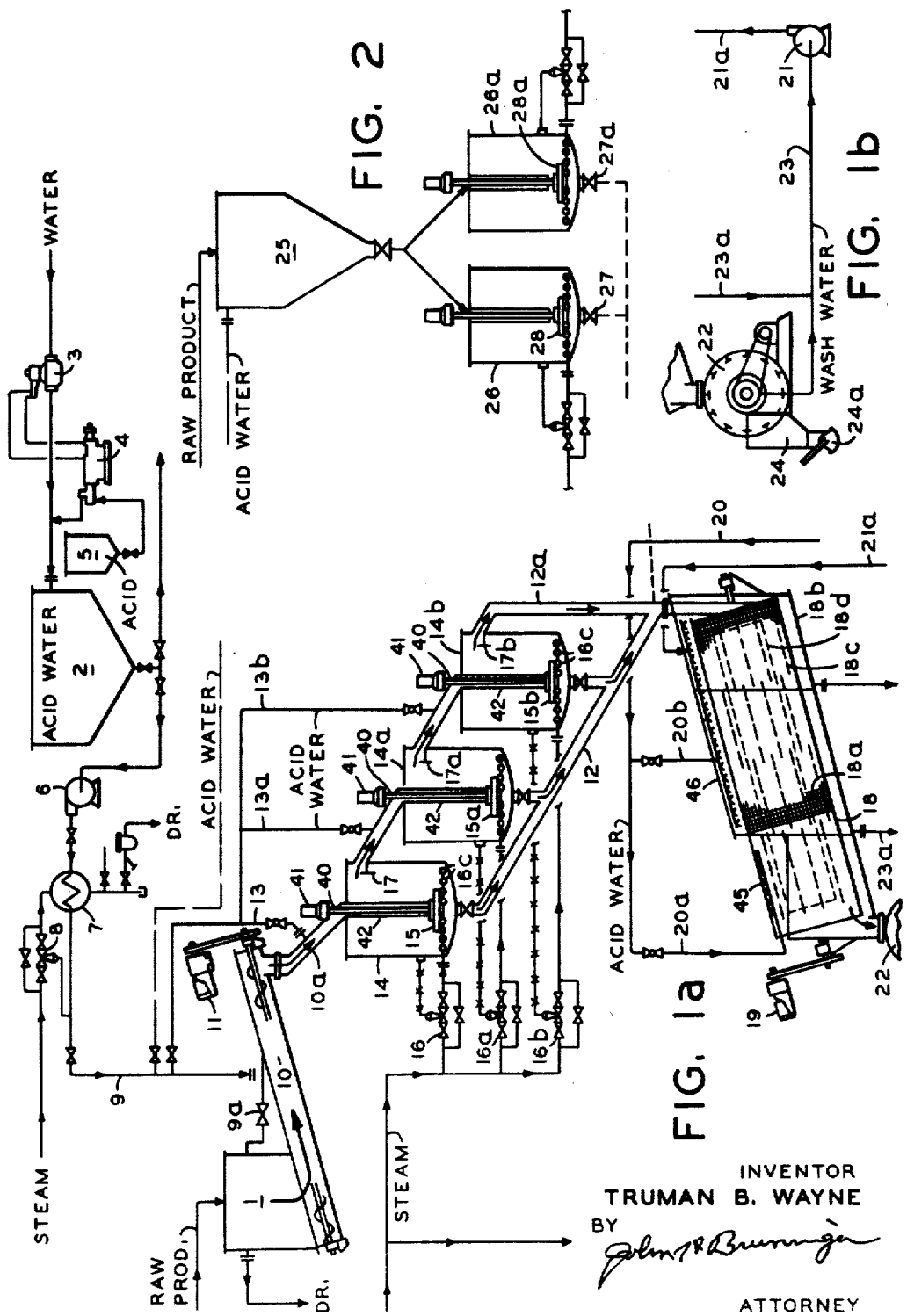

This invention relates to a process for cooking rice in industrial plants or large commercial establishments where cooked rice is required in much larger quantities than are prepared in the home or in restaurants of small to average size.

A particular object of this invention is to provide a means of preparing a uniformly cooked rice in large quantities by semi-continuous and continuous processes, and for recovering the cooked rice from its cooking waters in a relatively free flowing, well washed, substantially non-sticky form which will facilitate its further handling on belt conveyors, and/or in molds, freezing apparatus, drying apparatus and other handling or processing equipment.

A novel feature of applicant's process is that each and every grain or kernel of rice is afforded an equal opportunity to be subjected to the hydrating and gelatinizing effects of hot water under conditions which effect a classification and removal by overflow from one agitated vessel to a succeeding vessel in series as the rice hydrates and gelatinizes progressively towards the finished state.

Another novel feature of my process is the thorough separation of cooking waters and the removal from the surfaces of the cooked rice grains of free starch and glutinous materials deposited from the cooking waters so that each grain is separate and relatively free flowing.

A final feature of applicant's process is the shrinkage and temporary stiffening of the cooked rice grains by subjecting them to a continuous countercurrent washing operation with cold water, followed by removal of surface water by subjecting the cold rice to a suction dehydration step on a vacuum filter or its equivalent.

The above sequence of steps provides a completely cooked rice, or if so elected, a partially cooked or parboiled rice, which may easily be handled in further processing or transporting steps.

The advantages of cooking in a freely agitated water slurry followed by the washing and chilling steps above described may also be applied to batch cooked rice as will hereinafter be described under Example 2, although all of the advantages of high uniformity in the cooked product which are inherent to the continuous cooking, classification system are not fully realized.

In general, attempts to prepare large batches of cooked rice by a steaming procedure, such as is commonly used in cooking small batches in homes and restaurants, are not entirely satisfactory. Aside from the difficulty of even and equal penetration and heating by the steam, there is the problem of the weight of the column of rice and the pressure generated by each grain against the adjacent grains due to hydration and swelling to several times their original size. The effects of head pressure in large masses, the confining effects of the vessel and the hydration pressures all serve to form a sticky, semi-consolidated mass which does not readily crumble into free-flowing particles. Moreover, the sticky surface layers remain to further aggravate the problems. The usual recourse is to transfer the mass to a second vessel, wash it thoroughly and then attempt to drain or steam the rice to a satisfactory state of dryness. It would, of course, be possible to produce steamed rice, wash it in successive waters and dehydrate its surface on a vacuum filter; but the results are generally inferior to preparation in an excess of cooking waters followed by multistage washing on an apparatus of the type herein described which removes surface films and chills the rice so that further moisture removal may be accomplished without sticking and smearing on the cover of the vacuum filter apparatus.

Generally stated and in accordance with an illustrative embodiment of this invention, a water slurry of rice is heated to a temperature and for a period sufficient to hydrate the rice so as to decrease its specific gravity. The slurry progresses continuously in successive stages through vessels arranged in series which cause classification on the basis of degree of hydration as determined by successively decreasing specific gravities as the rice passes through a vessel and discharges to the next vessel in the series. More specifically, the slurry rises to the top of one vessel, passes to the bottom of the next vessel to again rise to the top of the latter. The temperatures are increased in the successive vessels, so as to more specifically in the successive vessels, (a) soak the rice to soften the same, (b) parboil the rice, and (c) complete the hydration of the rice. More specifically the top outlet of each vessel is adjustable vertically, viz., by a weir. More specifically heat is applied to the bottom of each vessel and the slurry in each vessel is agitated. More specifically from the last vessel of the series the rice is separated from the water and chilled.

In the illustrative embodiment, milled rice is freed of its hulls and contains from 10 to 13 percent of moisture which is part of the hard, crystalline structure of its endosperm. Its true specific gravity is approximately 1.5. As it hydrates and swells its specific gravity falls to within the range of 1.15 to as low as 1.05, this depending on the degree of hydration and swelling which has occurred. The more water that has been absorbed in the gel, the lower the specific gravity of the cooked rice. In the process embodying this invention, advantage has been taken of this progressive decrease in specific gravity to effect a sharp separation of the fully cooked rice, or rice which has been cooked to the desired point, at the overflow weir of each succeeding vessel in the series.

The following examples are representative of various illustrative embodiments of this process, and of the apparatus that is required to practice it. It will be understood, however, that equivalent procedures and combinations of batch, semi-continuous and continuous operations within the scope of the appended claims, may be used without departing from the spirit and intent of applicant's invention.

In the accompanying drawings:

FIGS. 1a and 1b represent diagram of the flow sheet of an illustrative embodiment; and FIG. 2 is a diagram of another embodiment.

Example 1

Reference is made to the process diagram in FIGS. 1a and 1b, raw milled, or dried, parboiled, milled rice and heated water are respectively introduced into steeping hopper 1 and screw conveyor 10 so that they meet in countercurrent flow through the apparatus. The rice has been delivered into the steeping hopper 1 by any suitable means such as a conveyor or by manual dumping. It is desirable that its level be maintained so that the rice will be submerged in the steep waters. The steep water has been prepared in tank 2 to which water has been delivered through flow meter 3 which actuates proportioning pump 4 which in turn delivers an acid solution such as phosphoric acid, citric or tartaric acid, or any other non-toxic inorganic or organic acid, from tank 5 into the plant water supply which enters tank 2. The steep water supply has an acidity ranging, for example, between pH 4.0 and 5.5, although variations above and below this range may occur. However, acidities which are too high may cause excessive hydrolysis of the starch and glutenins of the rice during cooking, whereas an alkaline reaction may discolor the cooked rice. The finished, cooked rice after separation from the water slurry, when immersed in distilled water, should have a reaction of pH 7.0 or lower, meaning that it is neutral or slightly acidic.

The acidified water is pumped through heat exchanger 7 by pump 6 where the water is heated by steam admitted through steam control system 8 which governs the temperature of the acidified water which flows through pipe 9 into conveyor 10. Valve 9a may be used to fill the system but is closed after the proper water level has been established in steeping hopper 1 and conveyor 10. The temperature range for the acidified, steep water is between 120° F. and 200° F., the temperature selected being governed by the temperature of the incoming raw or parboiled, dried rice and/or the degree of heating which is practiced in the succeeding cookers 14, 14a and 14b. Normally, the rice should be steeped at temperatures ranging from 120° F. to 160° F. for periods ranging in inverse order from 30 minutes to 180 minutes. The lower the temperature during the steeping operation, the longer the steeping period, and vice versa, since the purpose of the steeping operation is to cause water to enter the rice grains and initiate the hydration process. This tends to reduce the retention time of the rice through the cookers. This steeping operation is not particularly critical as to time and temperature, but these factors operate in inverse order, as above explained. In no case should the rice be sufficiently softened in the steeping operation to cause substantial attrition losses in the screw conveyor 10. The latter should be fabricated with a smooth trough and a machined or ground, uniformly smooth edge on its screw flight to allow close fitting of these parts and obviate the trapping and grinding of rice grains between the trough inner shell and the screw flight edge.

Screw conveyor 10, or its equivalent in a drag flight conveyor, is driven by a variable speed driver 11. Rice is delivered at the desired rate from conveyor 10 by means of chute 10a into a vessel in the form of a cooker 14. Acidified hot water from tank 2 is delivered at the desired rate through pipe 13 into chute 10a where it helps to deliver rice into cooker 14 by washing it down into this first vessel of the cooker series comprising two or more vessels, normally three.

Vessels 14, 14a and 14b are equipped with variable speed agitators 15, 15a and 15b for stirring the rice and water slurry. The agitators are of conventional form each having a shaft 40 suspended from a variable speed mechanism 41 and adapted to move the slurry upwardly. The slurry is supplied to the first batch in vessel 14 by the chute 10a which has an extension 42 surrounding the shaft 40 and opening at the bottom of the vessel 14 above the agitator. The chutes and extensions lead from the top of vessels 14, 14a to the bottom of the succeeding vessels 14a and 14b, with adjustable weirs 17, 17a and 17b at the outlets of the vessels. Steam is introduced through steam control valve assemblies 16, 16a and 16b into the respective cookers. The steam may enter the vessels directly through the coil arrangement 16c illustrated in FIG. 1, or may be introduced into a steam jacket surrounding the inner shell of the cooker. Likewise inner steam coils may be used. In any case, however, the temperature sensing element of each control valve assembly is in the rice-water slurry.

The cookers are preferably also equipped with vertical baffles (not shown) to facilitate the mixing and suspending of the rice in its various stages of hydration while in each of the succession of vessels. The agitator speeds are adjusted to produce the desired rate of exit of the slurry over weirs 17, 17a and 17b from the successive cooker vessels. The thickness of the slurry at any initial ratio of rice to water entering the first cooker will increase through the successive cookers. The density and viscosity of the slurry leaving cookers 14a and 14b may be regulated by several methods; (a) by the temperature which governs the rate of cooking in each vessel, (b) by raising or lowering the weirs to retard or speed the throughput, by adding hot water from lines 13a and/or 13b, or by initially starting the cooking operation with a compensating excess of water in cooker 14 to regulate the final slurry density leaving the system over weir 17b.

Cooking temperatures may range from 170° F. to 212° F. in the several cookers. The process is subject to considerable variations of temperature selection for each vessel in the series, this being dependent on rate of throughput and the individual cooking characteristics of the rice varieties. A normal practice is to maintain a temperature of 180° F. in cooker 14, 200° F. in cooker 14a and 205° F. in cooker 14b. The initial rice to water proportion entering cooker 14 is one pound of rice per gallon of hot water, but if compensation is introduced at this point for slurry density in cooker 14b, this ratio may be widened to one pound of rice to as much as two gallons of water. Usually, however, it is advantageous to start with the one pound per gallon proportion and adjust the slurry density in the succeeding cookers. This latter operation may be accomplished manually or by means of suitable slurry density controllers. The total cooking time following completion of the steeping operation ranges between 20 and 45 minutes, this depending on the rice variety, the degree of milling, parboiling if used, and the temperatures employed.

By-pass conduit 12 is provided for liquidating the contents of the cookers, and if desired, may be used to regulate the outflow from cooker 14b in conjunction with, or in lieu of, adjustable weir 17b.

The cooked rice slurry leaving cooker 14b, or the last cooker used in any lesser or greater number of assembled cookers, enters washer 18 through an extension of conduit 12a, which leads to near the bottom of the rotating reel of washer 18. This washer 18 is constructed with a perforated metal or wire mesh screen formed as a cylindrical reel 18a, which revolves within a tank housing 18b. This reel is equipped with a number of attached lifter flights 18c which, in rotating with the perforated reel, pick up the rice and carry it above the inner concentric cylinder 18d, which is rigidly attached to the reel by suitable structural supports. Sprays 45 and 46 attached to spray pipes 20a and 20b which are supplied with cold, acidified wash water from pipe 20, and also sprays attached to pipe 21a which recycles wash water returned from the two front compartments of tank 18b by means of recirculating pump 21, wash the rice from the perforated screen of the reel and from the lifters where its fall is broken by the interior, smooth surfaced drum. The angle of inclination of the reel and its inner drum may be varied to govern the retention time within the apparatus, but is normally about 12° from the horizontal. The speed of rotation of the drum also affects the retention time, and varies between 10 and 100 r.p.m., this being determined by the throughput rate and the diameter of the reel.

The cooked rice in the hot slurry leaving the last cooker in series first is screened from its cooking waters, and as it is carried by the flights within the reel to a position above the inner drum is first washed with recirculated wash water from the middle and lower drum compartments, the latter having furnished wash water and rice in slurry form to filter 22. The combined drainings from filter 22 and the drain pipe 23a from the middle tank compartment enter line 23 to the suction of pump 21 as previously explained. Fresh, cold acidified wash water from pipe 20 is successively sprayed on the rice through spray nozzles attached to pipes 20b and 20b and 20a, and the wash waters are then recycled. The temperature of the acidified spray water is preferably within the temperature range of from 35° F. to 60° F. and its effectiveness decreases at higher temperatures.

Filter 22 may be a top feed, rotary vacuum filter covered with a woven cover cloth or perforated metal screen. A cover cloth of nylon, Dynel or other synthetic fiber, which is not particularly absorbent of wash waters, and which easily washes clean of rice residues, is advantageous. If required, the rice may be further washed on the filter, but this is unnecessary if the washer 18 is properly operated. A vacuum of from 4 to 10 inches Hg is usually sufficient to remove the free moisture adhering to the cooked rice grains without unduly mashing them into the filter cover. The cooked rice which is now substantially freed from surface moisture is blown or shaken from the filter cover into feed hopper 24 from which it is discharged through gate 24a for further handling.

The advantages of applicant's invention are as follows: Large masses of rice can be thoroughly and evenly cooked by thus being slurried instead of swelling and packing together in a single vessel. The latter method causes uncooked grains to be enveloped in softer grains which have been cooked to a greater degree. There is a definite classifying action which provides a uniformly cooked end product because the lighter, more fully cooked grains successively rise to the next vessel in the series, leaving the denser, less hydrated grains behind to undergo additional hydration to the point where they will also rise and overflow to the next stage. Rice can be cooked more uniformly and with less loss from starchy waters if the first vessel provides the initial soaking, the second a parboil and the third the final hydration. Rice grains in each vessel rise and pass over the weir into the next vessel when they reach the specific gravity by water absorption which causes them to undergo such classification. The process is continuous and flexible between its several stages instead of being a batch operation where all progressive stages are carried out in one vessel with rice present in several stages of completion, depending on exposure to the heating medium or surface.

Example 2

Reference is made to the alternate system shown in FIG. 2. This is an embodiment of the fully continuous rice preparation process described in Example 1, in which the steeping and cooking steps are accomplished in batch sequence operations, but the drainage of cooking waters, washing and chilling of the cooked rice are accomplished in continuous, successive operations.

In this embodiment, FIG. 2, raw milled or parboiled and milled rice is placed in steep tank 25 with the requisite amount of acidified, hot water from tank 2, FIG. 1a. After steeping for from 30 minutes to 180 minutes, or longer, at temperatures ranging between 120° F. and 200° F. but normally at 120° F. to 180° F., the entire contents of tank 25 are discharged to either of batch cookers 26 or 26a where the rice is cooked to the proper degree. This requires from 20 to 45 minutes, depending on the cooking temperatures, the variety of rice, whether the rice is in the brown state or completely milled, and the cooking temperature employed. The usual procedure is to cook at about 205° F. for 25 minutes when cooking long grained rice while maintaining constant agitation by means of agitator 26 or 26a.

After cooking, the entire slurry is drained off through valve 27 or 27a into washer 18, FIG. 1. During cooking and the successive discharging of the rice to washer 18, the rice is kept in agitated slurry by means of tank agitators 28 or 28a. The cooking vessels are operated in timed, batch sequence so that one is cooking rice while the other is discharging its rice to the washer 18. Henceforth, the washing and dehydration steps through washer 18 and filter 22 are as described in Example 1, FIGS. 1a and 1b.

Reference is made to applicant's co-pending applications, Serial Numbers 9,574 and 9,575 filed February 18, 1960, which utilize gelatinized, viz., cooked rice, prepared as herein described in quick freezing processes for the preparation of dehydrated rice food products. The rice preparation process herein disclosed may be also used to prepare relatively large quantities of cooked rice in restaurant and hotel kitchens; for preparing packaged, quick frozen rice for distribution by food stores, and other uses where it is advantageous to prepare a relatively free flowing, properly cooked rice having superior handling properties.

In the foregoing descriptions the methods disclosed for preparing acidified steep water and the steeping method, itself, are not determining operations in applicant's process. The steep water may be manually prepared in one tank by drawing a suitable quantity of water, adding the acid and heating the acidified water by means of open or closed steam coils.

Having thus described the invention, what is claimed is:

1. The process of preparing rice in which a water slurry of the rice is heated to a temperature and for a period sufficient to hydrate the rice so as to decrease its specific gravity, comprising, subjecting the rice in successive vessels arranged in series to such heating in order to cause the rice to rise in the vessels, and conducting the slurry successively from the top of one vessel to the next vessel of the series.

2. The process of preparing rice in which a water slurry of the rice is heated to a temperature and for a period sufficient to hydrate the rice so as to decrease its specific gravity, comprising, subjecting the rice in successive vessels arranged in series to such heating in order to cause the rice to rise in the vessels, and conducting the slurry successively from the top of one vessel to the bottom of the next succeeding vessel of the series batch.

3. The process of preparing rice in which a water slurry of the rice is heated to a temperature and for a period sufficient to hydrate the rice so as to decrease its specific gravity, comprising, subjecting the rice in successive vessels arranged in series to such heating at temperatures increasing successively in successive vessels in order to cause the rice to rise therein, and conducting the slurry successively from the top of one vessel to the next succeeding vessel of the series.

4. The process of preparing rice in which a water slurry of the rice is heated to a temperature and for a period sufficient to hydrate the rice so as to decrease its specific gravity, comprising subjecting the rice in successive vessels arranged in series to such heating so as to cause the hydrated rice to rise in each vessel in accordance with the decrease of its specific gravity, and conducting the rice of lower specific gravity from the top of one vessel to the next succeeding vessel of the series.

5. The process of preparing rice in which a water slurry of the rice is heated to a temperature and for a period sufficient to hydrate the rice so as to decrease its specific gravity, comprising, subjecting the rice in successive vessels arranged in series to such heating applied at the bottom of each vessel in order to cause the rice to rise therein and conducting the slurry successively from the top of one vessel to the bottom of the next succeeding vessel of the series.

6. The process of preparing rice in which a water slurry of the rice is heated to a temperature and for a period sufficient to hydrate the rice so as to decrease its specific gravity, comprising, subjecting the rice in successive vessels arranged in series to such heating in order to cause the rice to rise in each vessel, conducting the slurry successively from a top outlet of one vessel to the next succeeding vessel of the series, and adjusting the top outlets vertically.

7. The process of preparing rice in which a water slurry of the rice is heated to a temperature and for a period sufficient to hydrate the rice so as to decrease its specific gravity, comprising, subjecting the rice in successive vessels arranged in series to such heating in order to cause the rice to rise in each vessel, conducting the slurry successively from the top of one vessel to the next succeeding vessel, and separating the rice discharged by the last vessel of the series from the water.

8. The process of preparing rice, comprising, soaking the rice in water to an extent sufficient to soften the rice, subjecting the resultant slurry of the rice in successive vessels arranged in series to temperatures and for periods sufficient to hydrate the rice so as to decrease the specific gravity in each vessel so as to rise therein, and conducting the slurry successively from the top of one vessel to the next succeeding vessel of the series.

9. The process of preparing rice, comprising, subjecting a slurry of the rice in successive vessels arranged in series to temperatures and for periods sufficient to hydrate the rice in the successive vessels, to (a) soak the rice, (b) parboil the rice and (c) complete the hydration of the rice, and to successively reduce the specific gravity in each vessel so as to rise therein, and conducting the slurry successively from the top of one vessel to the next succeeding vessel of the series.

References Cited in the file of this patent

UNITED STATES PATENTS

| | | |
|---|---|---|
| 2,187,718 | Wilbur | Jan. 23, 1940 |
| 2,438,939 | Ozai-Durrani | Apr. 6, 1948 |
| 2,498,573 | Ozai-Durrani | Feb. 21, 1950 |
| 2,571,555 | Fernandes | Oct. 16, 1951 |
| 2,638,838 | Talmey et al. | May 19, 1953 |
| 2,884,327 | Robbins | Apr. 28, 1959 |

UNITED STATES PATENT OFFICE
CERTIFICATE OF CORRECTION

Patent No. 3,085,011

April 9, 1963

Truman B. Wayne

It is hereby certified that error appears in the above numbered patent requiring correction and that the said Letters Patent should read as corrected below.

Column 5, line 59, for "26 or 26a" read -- 28 or 28a --.

Signed and sealed this 21st day of January 1964.

(SEAL)
Attest:
ERNEST W. SWIDER

Attesting Officer

EDWIN L. REYNOLDS

Acting Commissioner of Patents

8. The process of preparing rice, comprising, soaking the rice in water to an extent sufficient to soften the rice, subjecting the resultant slurry of the rice in successive vessels arranged in series to temperatures and for periods sufficient to hydrate the rice so as to decrease the specific gravity in each vessel so as to rise therein, and conducting the slurry successively from the top of one vessel to the next succeeding vessel of the series.

9. The process of preparing rice, comprising, subjecting a slurry of the rice in successive vessels arranged in series to temperatures and for periods sufficient so as to hydrate the rice in the successive vessels, to (a) soak the rice, (b) parboil the rice and (c) complete the hydration of the rice, and to successively reduce the specific gravity in each vessel so as to rise therein, and conducting the slurry successively from the top of one vessel to the next succeeding vessel of the series.

References Cited in the file of this patent

UNITED STATES PATENTS

| | | |
|---|---|---|
| 2,187,718 | Wilbur | Jan. 23, 1940 |
| 2,438,939 | Ozai-Durrani | Apr. 6, 1948 |
| 2,498,573 | Ozai-Durrani | Feb. 21, 1950 |
| 2,571,555 | Fernandes | Oct. 16, 1951 |
| 2,638,838 | Talmey et al. | May 19, 1953 |
| 2,884,327 | Robbins | Apr. 28, 1959 |

UNITED STATES PATENT OFFICE
CERTIFICATE OF CORRECTION

Patent No. 3,085,011          April 9, 1963

Truman B. Wayne

It is hereby certified that error appears in the above numbered patent requiring correction and that the said Letters Patent should read as corrected below.

Column 5, line 59, for "26 or 26a" read -- 28 or 28a --.

Signed and sealed this 21st day of January 1964.

(SEAL)
Attest:
ERNEST W. SWIDER

Attesting Officer

EDWIN L. REYNOLDS

Acting Commissioner of Patents

UNITED STATES PATENT OFFICE
CERTIFICATE OF CORRECTION

Patent No. 3,085,011                                                April 9, 1963

Truman B. Wayne

It is hereby certified that error appears in the above numbered patent requiring correction and that the said Letters Patent should read as corrected below.

Column 5, line 59, for "26 or 26a" read -- 28 or 28a --.

Signed and sealed this 21st day of January 1964.

(SEAL)
Attest:
ERNEST W. SWIDER

EDWIN L. REYNOLDS

Attesting Officer                                    Acting Commissioner of Patents